United States Patent [19]

Crocker

[11] 4,142,804
[45] Mar. 6, 1979

[54] APPARATUS AND PROCESS FOR FLUXING A MIXABLE THERMOPLASTIC MATERIAL

[75] Inventor: Zenas Crocker, Wellesley Hills, Mass.

[73] Assignee: Lewis Specialties Limited, Montreal, Canada

[21] Appl. No.: 862,596

[22] Filed: Dec. 20, 1977

Related U.S. Application Data

[63] Continuation of Ser. No. 610,831, Sep. 5, 1975, abandoned.

[51] Int. Cl.² .............................................. B29B 1/06
[52] U.S. Cl. ....................................... 366/77; 366/99; 366/108
[58] Field of Search ................... 366/69, 77, 79, 80, 366/97, 98, 99, 160, 162, 17, 116, 117, 118; 241/98; 68/23.1

[56] References Cited

U.S. PATENT DOCUMENTS

| | | | |
|---|---|---|---|
| 3,209,561 | 10/1965 | Burdett | 68/23.1 |
| 3,266,738 | 8/1966 | Goeser et al. | 241/98 |
| 3,645,505 | 2/1972 | McLeod | 366/160 |
| 3,822,057 | 7/1974 | Wheeler | 366/76 |
| 3,826,476 | 7/1974 | Ahrenberg | 366/17 |
| 3,888,470 | 6/1975 | Leisenberg | 366/69 |
| 3,923,290 | 12/1975 | Tillis | 366/77 |
| 4,076,220 | 2/1978 | Nakashima | 366/69 |

Primary Examiner—Robert W. Jenkins
Attorney, Agent, or Firm—Larson, Taylor and Hinds

[57] ABSTRACT

A process and apparatus for fluxing a mixable thermoplastic material is disclosed. In the process a blend of thermoplastic material is agitated in a mixer; at the same time vibrations of the mixer is monitored during this agitation step and when it reaches a predetermined level, a signal is generated so the mixer may be stopped or the material discharged. The apparatus includes a high intensity mixer, a means for monitoring vibrations of the mixer, together with a means for comparing these vibrations with a preset level to produce a signal to indicate the material in the mixer has reached the required degree of fluxing.

16 Claims, 2 Drawing Figures

APPARATUS AND PROCESS FOR FLUXING A MIXABLE THERMOPLASTIC MATERIAL

This is a continuation, of application Ser. No. 610,831 filed Sept. 5, 1975, now abandoned.

This invention relates to the fluxing of thermoplastic material and, more particularly, to a method and apparatus for mixing a thermoplastic material wherein the state of flux of the material controls the length of time the mixing occurs. The term "fluxing" used herein refers to the mixing of a material until it commences to change its state.

To prepare a thermoplastic material for extrusion, moulding, calendering, etc., into a film or the like, it is generally necessary to take the material in powder or granular form and blend it with other materials to be used in the compound. The other materials include stabilizers, lubricants, and in some cases, plasticizers, other modifiers as needed for low-temperature, impact, tensile strength or electrical resistance, and pigments where colour is required in the end product. In one method of preparing thermoplastic material, after the blending step, the material is fed into a high intensity mixer for fluxing. The high intensity mixing step causes the blend of materials to fuse together and flux until it reaches a state of flux when it can be passed to calender rolls, moulds or an extruder for further processing into film or the like.

Throughout the specification reference is made to a mixable thermoplastic material. This term refers to thermoplastic materials suitable for use in an intensive mixer and include acrylic, rigid and flexible PVC, ABS, styrene, both high impact and normal impact, cellulose acetate, cellulose acetate butyrate, copolyesters, thermoplastic rubbers, cellulose propionate, and polyolefins. Specifically excluded from mixable thermoplastic materials are those which might be referred to as unstable materials such as nitrocellulose, which cannot be mixed in a high intensity mixer.

A suitable high intensity mixer used for fluxing is one having a series of paddles which rotate at high speed hitting and throwing the particles at high velocity against the walls of the mixer and generally mixing the material. Such mixers are batch mixers and a batch of thermoplastic material is inserted into the mixer which is started up and run for a period of time until the material reaches the required state of flux. The fluxed material is then discharged and fed to the next step of the process. A refinement of the batch mixer is illustrated in U.S. Pat. No. 3,266,738 which issued Aug. 16, 1966, to Goeser et al. In this mixer a worm feed allows a batch of material to enter the mixer while it continues rotation; after the mixing step the discharge door is opened to allow the mixed batch to drop from the mixer. In this machine the rotation of the mixer is continuous. Certain problems occur with this batch type process to maintain the state of flux of the material discharged from the mixer constant from batch to batch. One known method of controlling the process is by timing. However, to ensure that the timing method produces a constant state of flux it is necessary to accurately control the quantity of the batch fed into the mixer, and ensure that the temperature of the mixer remains substantially constant throughout the process. For instance, a small batch may not require the same period in the intensive mixer to reach the necessary state of flux as a large batch. Thus, if you are working on a timing cycle with a fixed time for each batch then a variation in size of the batch gives a variation in the state of flux of that batch leaving the mixer. In many cases it has been found extremely difficult to accurately control the size of the batch. Powder and granular materials are always difficult to meter very accurately, because of a number of reasons including static electricity and humidity, which cause a build-up of materials in hoppers and feeders. Mixtures of liquids and solids, with the solids either in particle or pellet form, are also difficult to meter. Another parameter that can effect the state of flux is the temperature. Initially, on the first batch through an intensive mixer the body temperature of the mixer is generally low. Subsequently as the batches continue through the mixer, it heats up and the time for the batch to reach the required state of flux is reduced. However, if an interruption occurs between batches, then the temperature can change.

Another method of attempting to control the state of flux issuing from the mixer is by measuring the torque of the mixer shaft or the motor. Motor torque is measured by an ammeter as there is a direct relationship between current and torque. This, however, has certain difficulties in that the final fluxing step takes place in a matter of milliseconds and the change in motor torque occurs after the final fluxing step commences. Thus a measurement of the torque tends to be late in determining the state of flux.

To overcome the problems defined herein it has been found that the state of flux of the material issuing from a high intensity mixer may be controlled by letting the material itself tell us when it has reached the required state of flux. When one listens to a high intensity mixer with thermoplastic material being fluxed inside it, it is interesting to note that the instant the final fluxing step commences there is an immediate change in the sound of the mixer itself. This change is a change in sound frequency which is also represented by a change in the vibration frequency of the mixer itself. By measuring this sound frequency or vibration frequency it has been found that one can determine by experiment exactly the state of flux of the material in the mixer. Thus, by monitoring the vibration and producing a signal which represents this vibration, the signal can be compared with a preset signal, and when the preset signal is reached, the fluxing step is complete, and the fluxed material may follow other processing steps.

Thus, the present invention in one embodiment provides a process for fluxing a mixable, thermoplastic material in a batch mixer, comprising the steps of feeding a batch of the thermoplastic material into the mixer, agitating the batch in the mixer to flux the material, monitoring or measuring the vibration from the mixer during the agitation of the batch, cease agitating the batch in the mixer and fluxing the material when the vibration reaches a preset level representing the predetermined degree of fluxing.

In another embodiment of the invention there is provided an improvement in a process of fluxing a polyvinylchloride compound wherein a batch of a blend of the compound and other ingredients is fed into a high intensity mixer and mixed until the required state of flux is achieved, the improvement comprising the steps of monitoring or measuring the vibration of vibration in the mixer as the compound becomes fluxed, and automatically discharging the batch from the mixer when the vibration reaches a preset level.

Yet a further embodiment of the present invention provides an apparatus for fluxing a mixable thermoplastic material, comprising a high intensity mixer, means for monitoring or measuring the vibration from the mixer to produce a representative signal, comparative means for comparing the representative signal with a preset level signal representing a predetermined degree of fluxing of material in the mixer, and signal means for generating a further signal and operative when the representative signal reaches the preset level signal.

In drawings which illustrate embodiments of the invention:

Figure 1:
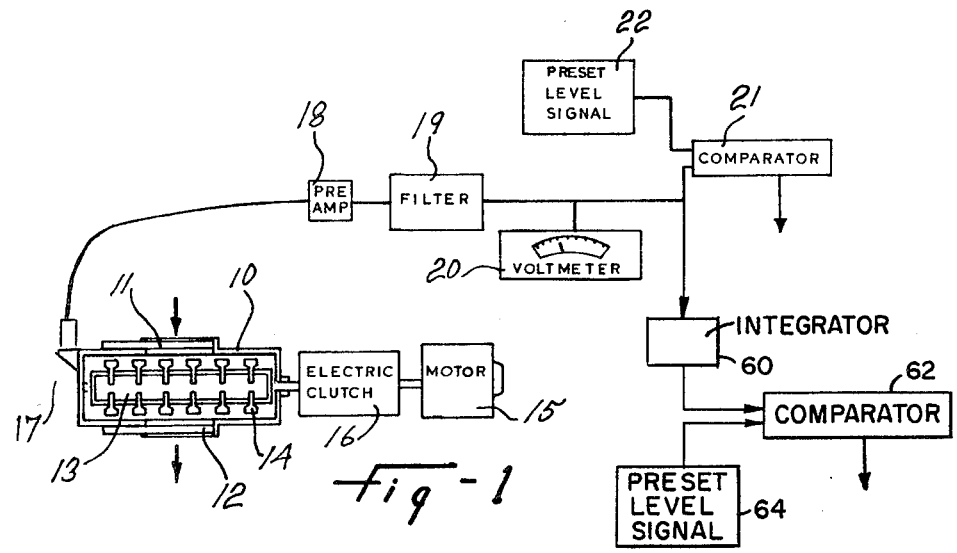
FIG. 1 is a block diagram illustrating a system for fluxing a mixable thermoplastic material.

Referring now to FIG. 1, a high intensity mixer 10 is shown with an entry slide gate 11 above the mixer 10 and an exit slide gate 12 below the mixer 10. The mixer shaft 13 has a series of paddles 14 which mix the material during the fluxing step. The mixer shaft 13 is driven by a motor and gear combination 15 through an electric clutch 16. The electric clutch 16 allows the mixer to be instantly disconnected from the motor without having to turn off the motor itself. The clutch may be a standard type such as electropneumatic or electromagnetic as is found suitable.

An accelerometer 17 is attached on the axial end of the mixer 10. The accelerometer is an electromechanical transducer which produces at its output terminals a voltage proportional to the acceleration to which it is subjected. By mounting the accelerometer 17 on the axial side of the mixer 10, a signal is produced which represents the vibrations occurring perpendicular to the axis of the mixer. The signal from the accelerometer 17 represents the R.M.S. value of the acceleration and is fed to a preamplifier 18 which produces a signal with a greater magnitude and covering a wider range. This greater signal is then filtered in a filter 19 and the final signal indicated on a visual display such as a voltmeter 20. The voltmeter 20 records a signal which is in direct proportion to the R.M.S. signal from the accelerometer 17. The signal from the filter is then compared in a comparator 21 with a predetermined value or preset level signal 22. The preset level signal 22 has a variable set point and is set according to the required degree of mixing or fluxing required in the material exiting from the mixer 10. When the amplified and filtered signal from the accelerometer 17 reaches this preset level, the comparator 21 produces a signal which through a relay (not shown) opens the exit slide gate 12 allowing the batch to discharge. After the material has discharged, the electric clutch 16 disengages, and the mixer stops rotating.

In operation, a batch of material is placed into the mixer 10, through the entry gate 11, and the mixing or fluxing step commences by the electric clutch 16 engaging the mixer shaft 13 with the motor 15. Initially the accelerometer 17 shows a fairly constant signal on the voltmeter as the initial mixing step occurs with the materials still in powder or granular form and has very little variation in vibration. When the mixing or fluxing commences it occurs very quickly in a matter of a few seconds. Thus the signal from the accelerometer continues as a steady signal for most of the process and then increases rapidly at the end. The signal from the accelerometer is amplified in the preamplifier 18, filtered through the filter 19 to remove spurious signals, and is displayed on the voltmeter 20. The needle on the voltmeter is seen to rise sharply at the end of the process when the material changes its state and becomes fluxed. The preset level signal is generally determined by trial and error, although experience gives an operator a good idea of the correct setting to obtain the required degree of flux. Once the signal from the filter 19 reaches the preset level signal, the comparator 21 immediately sends a signal to open the exit slide gate 12, thus allowing the material to discharge. After the discharge, the electric clutch 16 is disconnected, thus stopping the mixer 10. In some cases it may be desirable to continue processing the material in the mixer after the fluxing step, and in such a case the signal from the comparator 21 is used to change the speed of the motor driving the mixer, thus causing the second mixing step to have a different magnitude. It is found that the R.M.S. signal from the accelerometer 17 produces the same level of signal to represent the same state of flux of the material within the mixer regardless of the quantity of that material. Thus small variations in quantity of material do not affect the state of flux of the material. Furthermore, the time factor may vary from one batch to another, and certainly will if the quantity of material varies, or the body temperature of the mixer may vary. However, none of these variables change the state of flux of the material within the mixer.

If the mixer has a volumetric feeder attached to the body or an axial feeder of the type shown in U.S. Patent No. 3,266,738 then the mixer continues rotating at all times and a clutch as illustrated in the embodiment shown in the drawings is not necessary.

Figure 2:
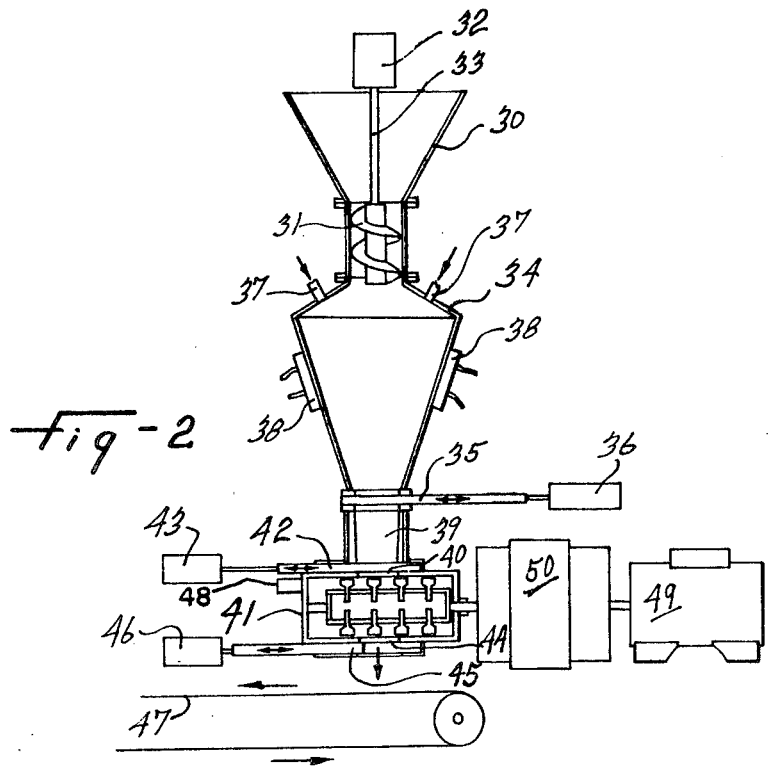
FIG. 2 is a schematic diagram of one embodiment of an apparatus for fluxing a mixable thermoplastic material.

The shematic diagram of FIG. 2 shows one installation of a high intensity mixer wherein a loading hopper 30 has a volumetric feeder 31 at its base. A motor 32 and shaft 33 pass vertically down through the hopper 30 and drive the volumetric feeder 31. Although not shown the shaft 33 may have a blade or other type of rotating arm attached thereto to ensure that the granular or powder material within the hopper 30 does not collect on the sides of the hopper and plug up the hopper 30. Directly below the volumetric feeder 31 is the loading hopper 34. This is an enclosed vessel of inverted conical shape having a slide gate 35 at its base which is operated by a pneumatic cylinder 36. The loading hopper 34 has two air blast nozzles 37 on top of the hopper and two vibrators 38 on the side of the hopper. The vibrators 38 and air blast nozzles 37 are employed to ensure the material in powder or granular form does not stick in the hopper when the slide gate 35 is opened. Beneath the slide gate 35 is a chute 39 which leads directly to an entry door 40 of a high intensity mixer 41. A mixer entry slide gate 42 is positioned directly over the entry door 40 operated by a pneumatic cylinder 43. The chute 39 has substantially the same inside diameter as the entry door 40 to avoid any possibility of hold-ups of the material falling from the hopper 34 into the mixer 41. At the bottom of the mixer 41 is an exit door 44 having a mixer exit slide gate 45 operated by a pneumatic cylinder 46. Mounted beneath the exit slide gate 45 is a conveyor 47 for removing the material falling through the exit door 44 and taking the material to the next stage of processing.

At the axial end of the mixer 41 a vibration monitoring device 48 such as is an accelerometer or a microphone to measure the R.M.S. value of the vibration within the mixer. The mixer is driven by a motor and gear arrangement 49 through an electric clutch 50. In operation the blended materials in powder or granular form are fed into the hopper 30 by feed means such as a flexible feed conveyor, not shown in the drawing, and fed individually in batches through the volumetric feeder 31 onto the loading hopper 34. When a batch is in the loading hopper 30 it is not allowed to sit for long as the slide gate 35 opens and the mixer entry slide gate 42 opens, thus permitting the batch to drop through the chute 39 into the mixer 41. To ensure that all the batch passes into the mixer 41 the vibrators 38 are set in operation as well as the air blast nozzles 37. As soon as the mixer is fully charged both the mixer entry slide gate 42 and the hopper slide gate 35 are closed. The mixer is then started up and commences to mix the batch of blended materials. At the same time another batch of blended materials is fed from the entry hopper 30 through the volumetric feeder 31 to the loading hopper 34. As soon as the fluxing step occurs to the material in the mixer 41, the from frequency monitoring device 48 signal increases until it reaches the preset level signal. The comparator then sends a signal to open the mixer exit slide gate 45 thus allowing the mixer 41 to throw the fluxed material through the exit door 44 onto the conveyor 47 which removes it for the next stage of processing. A time delay sufficient to ensure the material has had time to discharge occurs, and then the electric clutch 50 is disconnected to bring the mixer to rest in preparation for loading the next batch.

In one example of a process using the system shown in FIG. 1, the signal from the accelerometer is amplified to a range of 0 to 1 volt in direct proportion to the initial reading from the accelerometer. The preset level signal has a range of 0 to 100 percent of this 0 to 1 volt signal and is set in accordance with trial and error to ensure that material coming from the mixer is fully fluxed or fluxed to the extent required. When the signal from the accelerometer reaches this preset point, the comparator sends a second signal to open the exit gate to discharge the batch, or in the case where a low speed mixing step follows the fluxing step, to change the speed of the mixer.

In another embodiment of the system shown in FIG. 1 an integrator 60 is employed on the signal from the preamplifier. The integrator then produces a signal which represents the velocity of the vibration rather than the acceleration or R.M.S. value. This velocity signal is compared in a comparator 62 with a predetermined velocity signal 64 again calculated by means of trial and error and the comparator 62 sends a signal to discharge the batch when the velocity signal has reached the preset level. The velocity represents the speed of the vibration. In another embodiment there are two integrators on the same circuit. Thus the signal is equivalent to the amplitude of the vibration rather than velocity or acceleration and is compared with a predetermined signal representing amplitude. In a still further embodiment, the accelerometer is replaced by a microphone which measures sound emitting from the mixer. The microphone produces a signal which represents the sonic frequency of the sound. As the sonic frequency changes, this produces a signal which again can be compared to a predetermined and preset signal. The microphone is selected so that its range comes within the dynamic range of sound frequency emanating from the mixer.

Another advantage that has been found with the present invention is the ability of using an excessively high signal from the accelerometer as a safety to turn off the mixer. This high signal could be caused by a foreign object falling into the mixer or a blade breaking in the mixer.

We claim:

1. In a process of fluxing a polyvinylchloride compound wherein a batch of a blend of the compound and other ingredients is fed into a high intensity mixer and mixed until the required state of flux is achieved, the improvement comprising the steps of monitoring vibration in the mixer as the compound becomes fluxed and automatically discharging the batch from the mixer when the vibration reaches a preset level.

2. A process for fluxing a mixable, thermoplastic material in a batch mixer comprising the steps of;
   feeding a batch of the thermoplastic material into the mixer;
   agitating the batch in the mixer to flux the material;
   monitoring the degree of fluxing of the material by detecting the vibration of the mixer during the agitation of the batch;
   generating a signal representative of the detected vibration;
   comparing the generated signal with a predetermined value which represents the desired degree of fluxing;
   generating a further signal when the generated signal equals the predetermined value;
   and discharging the thermoplastic material from the mixer after the generation of said further signal.

3. The process according to claim 2 and further comprising commencing a second agitating step when the further signal is generated, the second agitating step being of different magnitude to the first agitating step.

4. The process according to claim 2 wherein the feeding step occurs while the mixer is stationary and before the agitating step commences.

5. The process according to claim 2 wherein the feeding step comprises feeding the material through a rotary volumetric feeder and into the mixer, and simultaneously continuously agitating the material in the mixer as the material is being fed into the mixer.

6. The process according to claim 2 wherein the detecting step comprises detecting the vibrational acceleration of the mixer.

7. The process according to claim 2 wherein the detecting step comprises detecting the vibrational velocity of the mixer.

8. The process according to claim 2 wherein the detecting step comprises detecting the vibrational amplitude of the mixer.

9. The process according to claim 2 wherein the detecting step comprises detecting the sonic frequency emitted by the mixer.

10. An apparatus for fluxing a mixable, thermoplastic material, comprising a high intensity mixer, means for monitoring the vibration of the mixer and for generating a representative signal thereof, comparator means for comparing the representative signal with a preset level signal representing a predetermined degree of fluxing of material in the mixer, and signal means operative when the representative signal reaches the preset level signal for producing a further signal.

11. The apparatus according to claim 10 wherein the representative signal is displayed on a visual display.

12. The apparatus according to claim 10 including at least one integrator to integrate the representative signal.

13. The apparatus according to claim 10 including a rotary volumetric feeder for feeding the material to the mixer.

14. The apparatus according to claim 10 and further comprising means responsive to said further signal to discharge the material from the mixer.

15. The apparatus according to claim 10 wherein the monitoring and generating means comprises and accelerometer and further including a preamplifier to amplify the representative signal and a filter to remove spurious changes in frequency.

16. The apparatus according to claim 10 wherein the monitoring and generating means is a microphone.

* * * * *